United States Patent
Loenko

(10) Patent No.: US 8,910,114 B2
(45) Date of Patent: Dec. 9, 2014

(54) OPTIMIZING CODE USING A BI-ENDIAN COMPILER

(75) Inventor: Mikhail Yurievich Loenko, Novosibirsk (RU)

(73) Assignee: Intel Corporation, Santa Clara, CA (US)

(*) Notice: Subject to any disclaimer, the term of this patent is extended or adjusted under 35 U.S.C. 154(b) by 167 days.

(21) Appl. No.: 13/383,427

(22) PCT Filed: Jun. 25, 2009

(86) PCT No.: PCT/RU2009/000316
§ 371 (c)(1),
(2), (4) Date: Jan. 11, 2012

(87) PCT Pub. No.: WO2010/151167
PCT Pub. Date: Dec. 29, 2010

(65) Prior Publication Data
US 2012/0185836 A1    Jul. 19, 2012

(51) Int. Cl.
*G06F 9/45* (2006.01)

(52) U.S. Cl.
CPC .............. *G06F 8/443* (2013.01); *G06F 8/447* (2013.01)
USPC ........... 717/106; 717/118; 717/131; 717/151; 717/154

(58) Field of Classification Search
None
See application file for complete search history.

(56) References Cited

U.S. PATENT DOCUMENTS

| 5,828,884 | A | 10/1998 | Lee et al. |
| 6,578,193 | B1 | 6/2003 | Adams |
| 7,552,427 | B2 * | 6/2009 | Adiletta et al. ............... 717/140 |
| 2004/0221279 | A1 | 11/2004 | Lovett et al. |
| 2004/0221280 | A1 | 11/2004 | Bolton et al. |
| 2006/0125663 | A1 | 6/2006 | Adiletta et al. |
| 2007/0016895 | A1 | 1/2007 | Tan |

FOREIGN PATENT DOCUMENTS

| CN | 101013380 | 8/2007 |
| EP | 1846819 A1 | 10/2007 |
| JP | 2009134771 | 6/2009 |
| RU | 98106762 | 2/2000 |
| WO | 2008-523514 | 7/2008 |

OTHER PUBLICATIONS

Intellectual Property Office of Singapore, Examination Report mailed Jan. 30, 2013 in application No. 2011082187/130130/TMFSL/4991.

(Continued)

*Primary Examiner* — Don Wong
*Assistant Examiner* — Deric Ortiz
(74) *Attorney, Agent, or Firm* — Trop, Pruner & Hu, P.C.

(57) ABSTRACT

In one embodiment, a method includes identifying a byte swap operation, building a domain including the byte swap operation and other expressions, identifying domain entries and domain exits associated with the domain, determining that a benefit will be obtained by performing a swap of the domain, and responsive to the determination performing the swap of the domain, and storing the swapped domain in a storage medium. Other embodiments are described and claimed.

11 Claims, 4 Drawing Sheets

(56) References Cited

OTHER PUBLICATIONS

Nakamori, Akira, "MIPS for First Readers" The Third Ilstallment, Episode 1, Oh!X, Japan, Softbank Publishing, Mar. 1, 2001, Spring 2001, p. 199.
Japanese Patent and Trademark Office, Office Action mailed Jun. 4, 2013 in Japanese application No. 2012-514913.
European Patent Office, Supplementary European Search mailed Oct. 24, 2012 in European application No. 09846596.6-1243/ 2446352 PCT/RU2009000316.
Patent Cooperation Treaty, "Notification of Transmittal of International Search Report and Written Opinion of the International Searching Authority," in international application No. PCT/RU2009/ 000316, mailed Apr. 15, 2010.

* cited by examiner

OPTIMIZING CODE USING A BI-ENDIAN COMPILER

BACKGROUND

Byte endianness is an attribute of data storage and retrieval where the storage and retrieval support multiple access sizes (e.g., 8-bit, 16-bit, 32-bit, 64-bit). Finer granularity accesses allow a programmer to see the order in which larger accesses store bytes in memory. Big-endian variables are stored in memory in the opposite byte order from little-endian variables. Little-endian variables are stored with the least significant byte in the lowest memory byte address. Big and little-endian variables containing the same value are identical when present in a processor register. It is only the order in memory that is different.

The order of bytes within 16-bit, 32-bit and 64-bit data is visible to the programmer. In the C programming language, the programmer can access bytes by using a union, a type of overlay data structure, or by casting a pointer to data of multiple bytes to a pointer to single bytes. Historically, these techniques were used to improve performance. Thus the same C/C++ code run on architectures of different endianness may produce different results. For example, for the C code: int i=0x12345678; and char c=*((char*)&i), the value of 'c' will be 0x12 if the code is compiled and run on a big-endian architecture, and it will be 0x78 if the code is compiled and run on a little-endian architecture.

A compiler with bi-endian technology allows compiling of source code that is originally developed for a big-endian architecture to run on a little-endian architecture. If the code is compiled in a special mode, in most cases it works the same way it would work if it was compiled and run on a big-endian architecture, i.e., 'c' is equal to 0x12 in the example above. This behavior is achieved by adding 'byte swap' operations before loads and stores into the memory of the data specified as big-endian.

A compiler with bi-endian technology is typically used to compile legacy code to run on modern little-endian architectures. A programmer typically marks all legacy code as big-endian, rather than determining whether each specific piece of data has to be big- or little-endian. So, the compiler adds byte swaps before loads and stores of the data, even when its endianness is not important to the programmer. This adversely impacts performance.

DETAILED DESCRIPTION

Figure 1:
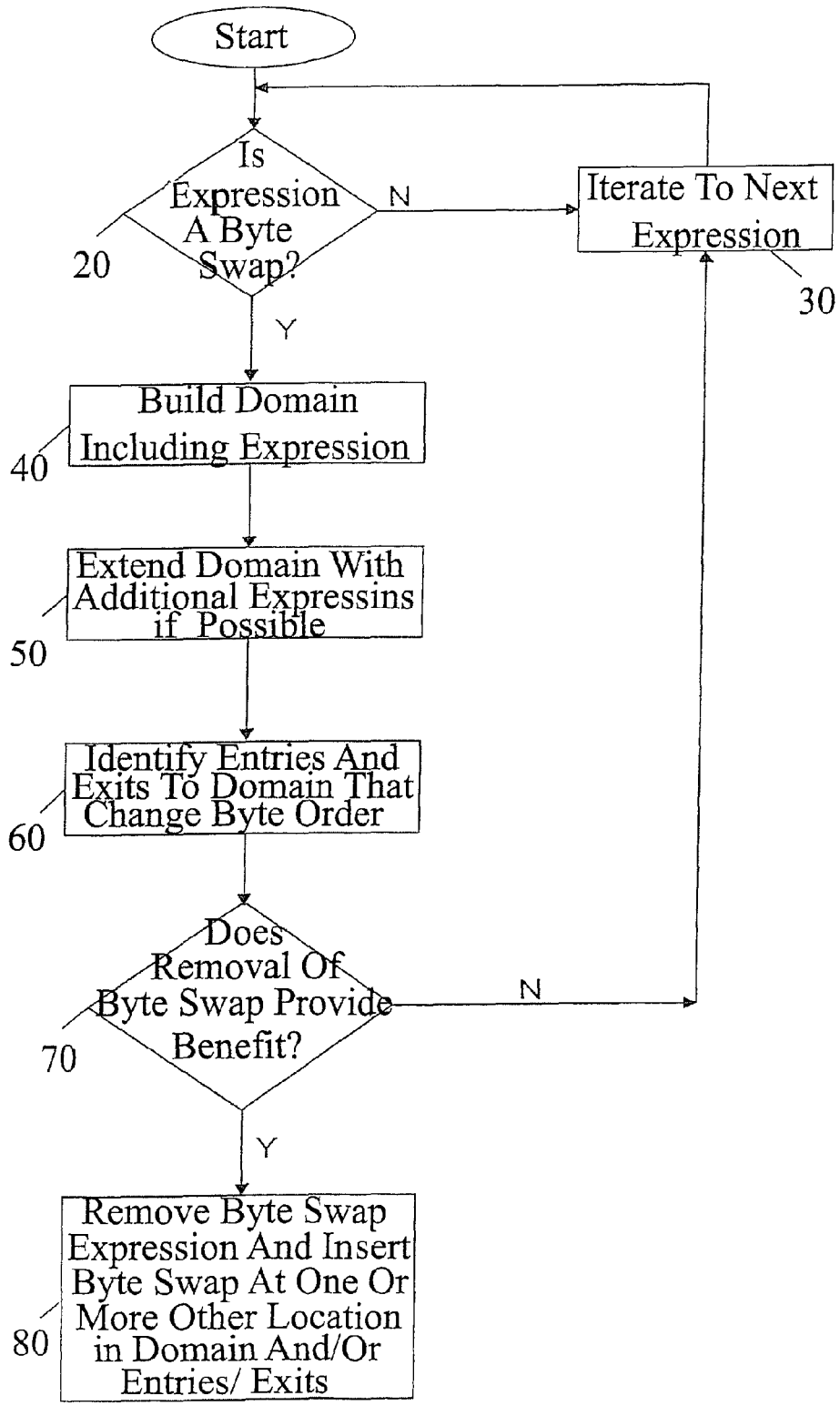
FIG. 1 is a flow diagram of a method for performing byte swap elimination in accordance with one embodiment of the present invention.

Embodiments may improve performance of generated code via elimination/moving to colder paths of byte swap operations based on a concept of a domain swap. Still further, embodiments may override the choice of data byte order type when possible to improve performance.

As used herein, a swap-tolerant expression is an expression of code being compiled that can be replaced with a counterpart expression operating on some (or all) arguments of different byte order and producing a valid result of the same or a different byte order. As some examples, comparison to a constant (e.g., x==0x12345678) is swap-tolerant since it has a counterpart (y==0x78563412) which if given a swapped argument SWAP(x) would produce the same result as the original expression, where SWAP is an expression to perform a byte swap operation. A bit AND operation is swap-tolerant since there is an operation (the same bit AND) such that taking the swapped arguments would produce the correct but of different byte order result. However, arithmetic (e.g., +, −, *, /) operations are not swap-tolerant since they strictly require data of specific byte order and produce an erroneous result if swapped arguments are taken.

A domain is a set of expressions of code being compiled, while a domain entry is an expression outside the domain, a result of which is taken as an argument by an expression belonging to the domain. A domain exit is an expression outside the domain that takes a result of an expression belonging to the domain as an argument. A swap-tolerant domain is a set of swap-tolerant expressions that can be replaced by their counterpart expressions so that if some (or all) domain entries are replaced with data of different byte order, then all the domain exits would be valid results of the same or a different byte order.

A swap of a domain is a transformation of code being compiled that: (1) changes the byte order of some or all domain entries and exits by placing or removing byte swap operations at necessary domain entries and exits; and (2) substitutes all expressions in the domain with counterpart expressions operating in a different byte order, so that code semantics are preserved. For a domain swap with regard to entries and exits, a byte swap can be removed if the entry or exit expression is a byte swap, otherwise a byte swap can be inserted.

As an example,
T1=SWAP(A)
T2=SWAP(B)
RES=T1==T2

The expression "T1==T2" is a swap-tolerant domain, the expressions "SWAP(A)" and "SWAP(B)" are domain entries, and the assignment "RES= . . . " is a domain exit. Here is what a domain swap would look like for this code:
T1=A//byte swap is removed
T2=B//byte swap is removed
RES=T1==T2//byte order of result is the same: nothing is added or removed.

Thus for each swap-tolerant expression it is known which of the entries (i.e., arguments) and exits (i.e., results) will change byte order if a domain swap is performed. For example, in the expression X?Y:Z (if X then Y, else Z), the byte order of Y and Z will be changed and the byte order of X will be kept: X?Y':Z'. Thus it is known which entries and exits of the domain change their byte order and a byte swap operation (SWAP) is inserted/removed for these only.

A domain swap benefit is a performance benefit from a domain swap such that an amount of code inserted minus an amount of code removed (taking into account weights of specific instructions placed/removed as well as estimated execution counters) results in a positive number.

As an example,
T1=A
T2=SWAP(B)
RES=T1==T2

Here is what a domain swap would look like:
   T1=SWAP(A)//byte swap is placed
   T2=B//byte swap is removed
   RES=T1==T2//nothing is added or removed
A domain swap benefit is positive if "T1=A" in the original code is colder than "T2=SWAP(B)". Note that the terms "cold" and "hot" refer to the relative frequency or use of a given code segment. A "cold" code segment is used less frequently or more distant in time with respect to another code segment. So, as shown by this example, a domain swap may result in moving the SWAPs around in the code.

Referring now to FIG. 1, shown is a flow diagram of a method for performing byte swap elimination in accordance with one embodiment of the present invention. Method 10 may be performed by a compiler that executes on one or more processors of a computer system. While the scope of the present invention is not limited in this regard, some embodiments may be performed to optimize code that is written for a big-endian architecture for a little-endian architecture. That is, the compiler may execute on a processor that is of a little-endian architecture.

As seen in FIG. 1, method 10 may begin by determining whether an expression of code to be optimized includes a byte swap operation (diamond 20). If not, control may iterate to the next expression (block 30). When a byte swap expression is encountered, control passes to block 40, where a domain may be built including this expression. While the scope of the present invention is not limited in this regard, embodiments may seek to expand the scope of a domain to thus enable optimization of a number of expressions in a single pass. Details of building of a domain are discussed further below. In the course of building a domain, the domain may be extended with additional expressions if possible (block 50). Further details of extending a domain are also discussed below. At the conclusion of building of a domain, the various entries and exits to the domain that change byte order may be identified (block 60). As discussed above, the domain entries may be various arguments that are inputs to the domain, while the exits may be various results that are used as arguments outside of the domain.

Referring still to FIG. 1, at diamond 70 it may be determined whether removal of a byte swap provides a benefit (diamond 70). As discussed above, this determination may be performed by the compiler based on various profiling information, including a determination of a difference between the amount of expressions inserted into the code and the amount of expressions removed from the code, and profiling information regarding various execution counts associated with such expressions. It may be further determined whether this benefit is greater than a threshold. In one embodiment, this threshold to indicate that a benefit is provided may be zero, such that if the benefit determination results in a positive number, a benefit would be provided. Note that if a benefit would not be provided by removal of the byte swap, no byte swap elimination is performed and the compiler may iterate to the next expression (with regard to block 30 discussed above).

If instead it is determined that removal provides a benefit, control passes to block 80. At block 80, the byte swap expression may be removed, thus replacing this expression with a counterpart expression. Still further, one or more additional byte swaps may be inserted/removed at other locations within the domain (block 80). Furthermore, such byte swap expressions may similarly be inserted or removed in one or more of the domain entries and/or exits. The modified code may then be stored in an appropriate storage such as a system memory or a non-voltage storage for later execution when a program including the modified code is called. While shown with this particular implementation in the embodiment of FIG. 1, understand the scope of the present invention is not limited in this regard and other implementations are possible.

To build a swap-tolerant domain, one can start with any swap-tolerant expression or from a byte swap desired to be removed and extend the domain with connected swap-tolerant expressions. If further domain extension is either impossible or does not make performance sense, the domain swap may be performed and other domains may be built. Domain extension is possible when there are adjacent swap-tolerant expressions. Still, several domains may be built, because for each adjacent swap-tolerant expression it may be determined to not add it to a current domain, and several domains will have different domain-swap benefits. Thus either a full search can be performed to find the best built domain, or some heuristics may be applied. Certain embodiments may be based on use of heuristics. Byte swap elimination may thus identify and swap all the swap-tolerant domains that provide a positive swap benefit as described above.

Thus in various embodiments, operations on data of some byte order is replaced with equivalent operations over the same data of a different byte order. Further, multiple connected expressions and multiple connected data can be optimized at once in a single pass. As a result of the optimization, not only are some of the byte swaps eliminated but others are moved to colder paths. Thus expressions may be replaced with a counterpart expression operating on data of different byte order, swaps may be moved within the code, and multiple connected data may change its byte order. In this way, byte swaps can be eliminated by replacement of a piece of code operating on data of one byte order with an equivalent piece of code operating on data of a different byte order.

Referring now to Table 1, shown is a pseudo-code representing a possible implementation of an algorithm in accordance with one embodiment of the present invention. As seen in Table 1, several functions may be provided for byte swap elimination and building a domain. As seen, the byte swap function calls the domain building function. In addition, in determining whether a benefit would inhere in removing a byte swap expression, another function entitled BENEFIT may be performed. As discussed above, this function may determine that a benefit is present if the calculation results in a positive value. If this positive value is found, another function called SWAP_DOMAIN may be performed to implement the actual removal and insertion of byte swap operations at the appropriate locations within the domain as well as the domain entries and exits. Note that this pseudo-code is exemplary, and other implementations are possible.

TABLE 1

```
FUNCTION BSWAP_ELIMINATION( ) {
    FOR EACH function BEING COMPILED {
        FOR EACH expression IN function {
            IF IS_BYTE_SWAP(expression) {
                /* try to eliminate this specific byte swap */
                entries_and_exits:= {expression}
                domain := { }
```

TABLE 1-continued

```
            BUILD_DOMAIN (expression, domain, entries_and_exits)
            IF BENEFIT(domain, entries_and_exits) > 0 {
                SWAP_DOMAIN(domain, entries_and_exits)
            } END IF
        } END IF
    } END FOR EACH
  } END FOR EACH
}
FUNCTION BUILD_DOMAIN (expression, domain, entries_and_exits) {
    FOR EACH other USE_OR_DEFINE expression {
        IF SWAP_TOLERANT(other) AND NOT (other BELONG domain) {
            domain += other
            /* iterate through those arguments and results of 'other' that have
            different byte order if we replace expression with its counterpart */
            ITERATE (arg, other) {
                IF arg == expression CONTINUE
                BUILD_DOMAIN (arg, domain, entries_and_exits)
            }
        } ELSE {
            entries_and_exits += other
        } END IF
    } END EACH EXPR USAGE
}
```

Embodiments may further control the choice of data byte order. That is, rather than selecting data byte order as the programmer has specified, a compiler may check whether the byte order of each specific piece of data affects semantics of the program, and if it does not, the byte order for this specific piece of data can be set from a performance perspective.

As used herein, the byte order of data (e.g., variables, data structures, heap data, function arguments, etc.) is not visible to a programmer if all the storages and retrieves of the data are of the same size. To prove that all the storages and retrieves of the data are of the same size, the compiler ensures the following: the data cannot be accessed through other variables (e.g., union members) of different size; the address of the data (if ever taken) is not seen directly externally (i.e., outside the code being compiled), nor stored to a variable that is visible externally, nor passed to/obtained from an external function, nor participates/obtained in expressions that the compiler cannot follow; and if the address of the data is taken and casted to a pointer to data of a different size then there is no read/write by that pointer. However, a compiler may allow known exclusions from these prerequisites for external functions like maloc/free/etc and still guarantee that all the retrieves and storages are of the same size.

Data byte order visibility may be calculated conservatively. For example, byte order can be treated as visible if not proved otherwise. To define byte order visibility of function arguments, a compiler additionally can ensure that all the calls of the function are known (including indirect calls). As examples, the byte order of a top level static variable, the address of which is never taken is not visible to the programmer, while the byte order of a global variable in a per-module compilation is considered as visible to the programmer.

Pieces of data compose a group if they must have the same byte order. In the example below variables 'a' and 'b' must have the same byte order and thus the compiler must preserve this order:

int* ptr=condition ? &a:&b
   ptr[3]=10.

To determine which byte order of a specific data makes more performance sense, a compiler in accordance with an embodiment of the present invention checks how the data is used. If according to execution counters the data is more frequently used in a big-endian context the compiler makes that data big-endian when possible. Sometimes byte order of a context is unknown (for example the data is copied from one variable to another and the compiler has not decided about byte order of both variables yet). In this case, heuristics can be used to choose better endianness with a higher probability.

Thus a compiler in accordance with an embodiment of the present invention may perform the following: 1) break all the data on which a program operates into groups that must have the same byte order; 2) select the groups such that byte order of all the data in the group is not visible to programmer; 3) refine selection by choosing only those groups, that if byte order were changed would give a positive performance benefit; and 4) change the byte order of selected groups by adjusting all the reads/writes of the groups' data.

Figure 2:
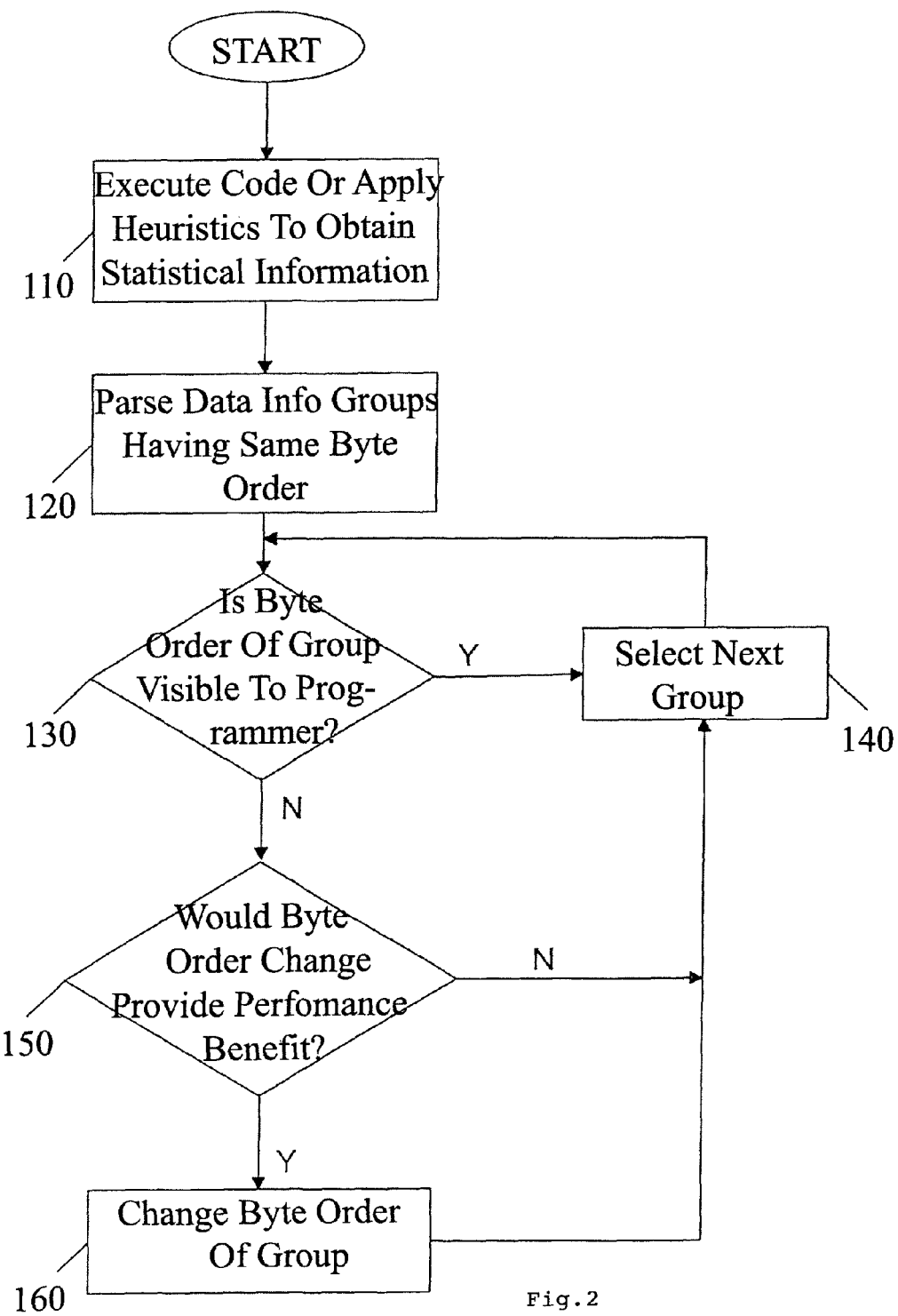
FIG. 2 is a flow diagram of a method for optimizing code by controlling data byte order in accordance with one embodiment of the present invention.

Referring now to FIG. 2, shown is a flow diagram of a method for optimizing code for controlling data byte order in accordance with one embodiment of the present invention. As shown in FIG. 2, method 100 may be implemented using a bi-endian compiler that executes on a processor of a system, e.g., a processor having a little-endian architecture. As seen in FIG. 2, method 100 may begin by executing code or applying heuristics to obtain statistical information regarding a given segment of code (block 110). Such statistical information may be obtained in a first pass execution of the compiler, which may execute the code or perform other operations to obtain the statistical information. Then, the data may be parsed into groups (block 120). More specifically, the data may be parsed into groups in which each of the data have the same byte order. That is, all the data of a group may be big-endian or little-endian.

For each group, it may then be determined whether the byte order of the group is visible to a programmer (diamond 130). As will be discussed further below, various analyses may be performed to determine whether the byte order is visible. This analyses may be based at least in part on the statistical information obtained during the first pass. If the byte order is visible, control passes to block 140, where a next group may be selected, as no optimization is possible on this group of data.

Otherwise, control passes from diamond 130 to diamond 150, where it may be determined whether a byte order change to the data of the group would benefit performance. As will be discussed further below in various implementations, different calculations may be performed to determine whether a performance benefit would be provided. If no benefit would be provided, no optimization is performed and a next group may be selected (block 140). Otherwise, if a byte order change would provide a performance benefit, control passes to block 160 where the byte order of the group may be changed. The modified code may then be stored in an appropriate storage such as a system memory or a non-voltage storage for later execution when a program including the modified code is called. While shown with this particular implementation in the embodiment of FIG. 2, the scope of the present invention is not limited in this regard.

In one implementation, a compiler optimization may work on two compilation passes. On the first pass, information about data usage is accumulated and byte order preference is calculated from a performance perspective. On the second pass, the data usage is adjusted according to the selected byte order for each specific piece of data. Thus, it may be determined whether byte order for a specific piece of data is visible. Second, the byte order that makes more sense from the performance perspective may be identified. Finally, the byte order of specific data may be converted.

Each piece of data (variable, function argument, function, etc.) has a DATA_ADDRESS fake pointer, which is treated like a normal pointer containing the address of that data. In one embodiment, each pointer (and DATA_ADDRESS fake pointers) maintains various data structures.

Figure 3:
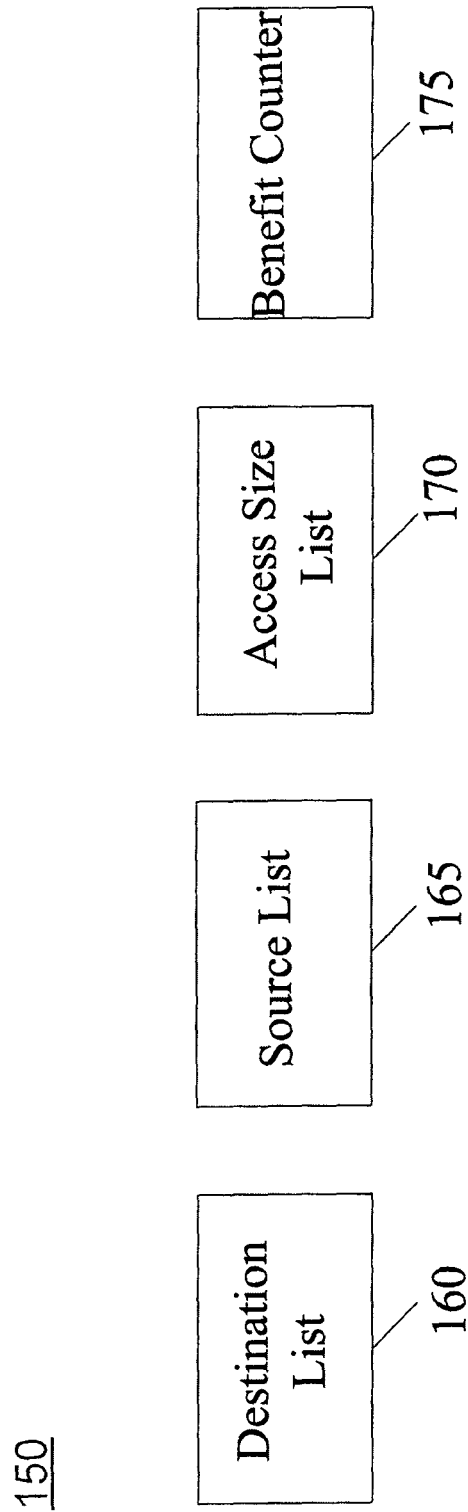
FIG. 3 is a block diagram of various data storages to store performance statistics in accordance with one embodiment of the present invention.

In one embodiment, the structures may be stored in a performance monitor table 150 such as shown in FIG. 3, which is a block diagram of various storages to store performance statistics in accordance with one embodiment of the present invention. In some embodiments, table 150 may be stored in a system memory, although in other implementations the table may be stored in a cache memory of a processor on which the compiler executes. As shown in FIG. 3, table 150 may include a destination list 160 to store, for each pointer and data address fake pointer a list of pointers to which the pointer was copied. Similarly, source list 165 stores a list of sources associated with the corresponding pointer. In addition, an access size list 170 may store a size of a read/write associated with the corresponding pointer. In turn, a benefit counter 175 may be incremented/decremented depending on whether a byte order change would (positively or negatively) affect performance with regard to an expression associated with a pointer. Thus each pointer and fake pointer may maintain each of these lists. In one embodiment, VALUE_COPIED_TO and VALUE_COPIED_FROM lists (corresponding to destination list 160 and source list 165) may contain other pointers; ACCESS_SIZE list (which corresponds to access list 170) contains integers; and benefit counter 175 accumulates data usage statistics. Initially, the ACCESS_SIZE list for DATA_ADDRESS fake pointers corresponding to externally visible symbols (variables, functions) as well as variables which can be accessed through other variables (e.g., union members) and those other variables that are of a different size, contain a zero value (in an embodiment in which zero access size indicates visible byte order). Other lists are initially empty, and the benefit counters are initially set to zero.

At the first pass, the compiler fills these lists with real data. Each time a value is copied from one pointer to another, the VALUE_COPIED_TO list of the source and the VALUE_COPIED_FROM list of the destination are extended appropriately. Each time an address of data is stored, the VALUE_COPIED_TO of the source ADDRESS_DATA and the VALUE_COPIED_FROM of the destination are extended appropriately.

Each time a read/write is found, a corresponding ACCESS_SIZE list entry is extended with the read/write size. At that, the benefit counter is either increased or decreased by a heuristical execution counter of the current expression or stays untouched depending on how byte order change would modify the expression. In the examples below, changes of various expressions reflect change of the byte order of variable A:

A=SWAP(B)→A=B//benefit counter grows
A=0x12345678→A=0x78563412//benefit counter stays untouched
A=B→A=SWAP(B)//benefit counter is reduced.

Each time an unsupported operation on a pointer or data address is found, the corresponding ACCESS_SIZE list is extended with a zero value. At the end of the first pass, all the lists are built and the compiler has enough information to determine byte order visibility. If for the given data, the union of the ACCESS_SIZE lists of all the pointer variables achievable transitively through the VALUE_COPIED_TO list of ADDRESS_DATA contain no more than a single element (and that element is non-zero), then all reads/writes of the data are of that specific size and thus byte order of this specific data is not visible to programmer.

To find which data pieces must have the same byte order as the given data (i.e., which data pieces compose a Group), the compiler builds a list of ADDRES_DATA pointers achievable transitively through VALUE_COPIED_TO and VALUE_COPIED_FROM lists. Optimization over the whole Group is possible if the union of the ACCESS_SIZE lists of all pointers achievable transitively through the VALUE_COPIED_TO and VALUE_COPIED_FROM lists contains no more than a single element and that element is non-zero.

If the byte order of the whole Group is not visible to the programmer and a choice of a different byte order for the whole Group would give a performance benefit (e.g., a sum of BENEFITs for all pointers transitively accessible is positive), the compiler makes a swap and adjusts data usage.

Thus embodiments check how each specific piece of data is used, and make a byte order decision based on execution counters and data usage. Further, embodiments are applicable to all data that fits criteria, rather than to specific classes of data (such as return values only). Byte order choice is based on data usage in the application being compiled; the decision is made for each specific piece of data for each specific application, rather than a "one fits all" model. In this way, a compiler can decide which data should be of different byte order rather than relying on a user decision, enabling generated code with higher performance.

Referring now to Table 2, shown is simplified pseudo-code for providing the two passes in accordance with one embodiment of the present invention. As seen in Table 2, the two passes are executed by a compiler to control selection of byte order for specific data. As seen, the first pass may be used to execute the code or perform other heuristics to gather usage statistics that include updating of various lists associated with each variable and pointer of the code. Then the second pass is performed to optimize the code based on the gathered usage statistics. When it is determined that a byte order change will optimize the code, such byte swap operations are inserted/removed from the code.

TABLE 2

```
PASS1: gathering usage statistics
FOR_EACH function BEING_COMPILED {
    FOR_EACH expression IN function {
        SWITCH TYPE_OF(expression) {
```

TABLE 2-continued

```
    Case A = B:
        // Each time a value is copied from one pointer to another
            VALUE_COPIED_TO list of the source and
        // VALUE_COPIED_FROM list of the destination are extended
            appropriately:
        VALUE_COPIED_TO(B) += {A};
        VALUE_COPIED_FROM(A) += {B};
    Case A = &B:
        // Each time an address of data is stored at the variable,
            VALUE_COPIED_TO of the source's
            ADDRESS_DATA and
        // VALUE_COPIED_FROM of the destination are extended
            appropriately A
        VALUE_COPIED_TO( DATA_ADDRESS(B) ) += {A};
        VALUE_COPIED_FROM(A) += { DATA_ADDRESS(B) };
    Case *PTR:
        // Each time a read/write via a pointer is found ACCESS_SIZE
            of the pointer is extended with access size.
        ACCESS_SIZE(PTR) += SIZE(*PTR)
        // The BENEFIT might be increased, decreased by the
            execution counter of the current expression or stay
        // untouched depending on how byte order change would
            modify the expression.
        BENEFIT(PTR) += ...
    Case A:
        // Each time a direct read/write is found ACCESS_SIZE of the
            DATA_ADDRESS is extended with access size.
        ACCESS_SIZE( DATA_ADDRESS(A) ) += SIZE(A)
        // The BENEFIT might be increased, decreased by the
            execution counter of the current expression or stay
        // untouched depending on how byte order change would
            modify the expression.
        BENEFIT( DATA_ADDRESS(A) ) +=
    Case xxxx:
        // other supported types of expressions: modify lists as
        appropriate
    Default:
        //complex or unsupported expressions
        FOR EACH pointer IN expression {
            ACCESS_SIZE(pointer) += {0}; // mark that we don't
                have enough information here
        }
    }
}
}
PASS2: optimizing the code
FOR_EACH function BEING_COMPILED {
FOR_EACH expression IN function {
    FOR_EACH data IN PARAMATERS(expression) {
        IF NEED_BYTE_ORDER_CHANGE(data) {
        // found data, byte order of which needs to be changed: place additional byte
    swap
            REPLACE_IN_EXPRESSION(expression, data,
                NEW_SWAP_EXPRESSION(data))
        }
    }
FOR EACH data IN RESULTS(expression) {
    IF NEED_BYTE_ORDER_CHANGE(data) {
        // do similarly for expressions where the data is assigned, i.e. replace
        // data := f(x,y,z) with data := SWAP(f(x,y,z,))
        }
    }
  }
}
```

As shown in Table 2, since the total BENEFIT is positive, the swaps that are put here will likely be optimized away using one of the following transformations:

SWAP(SWAP(X))→X
SWAP(const)→const_swapped

So that an expression like:

X:=SWAP(SWAP(X)+1)//X is big-endian is converted first to:

X:=SWAP(SWAP(SWAP(SWAP(X))+1)))//X is little-endian and later optimized to:

X:=X+1

Figure 4:
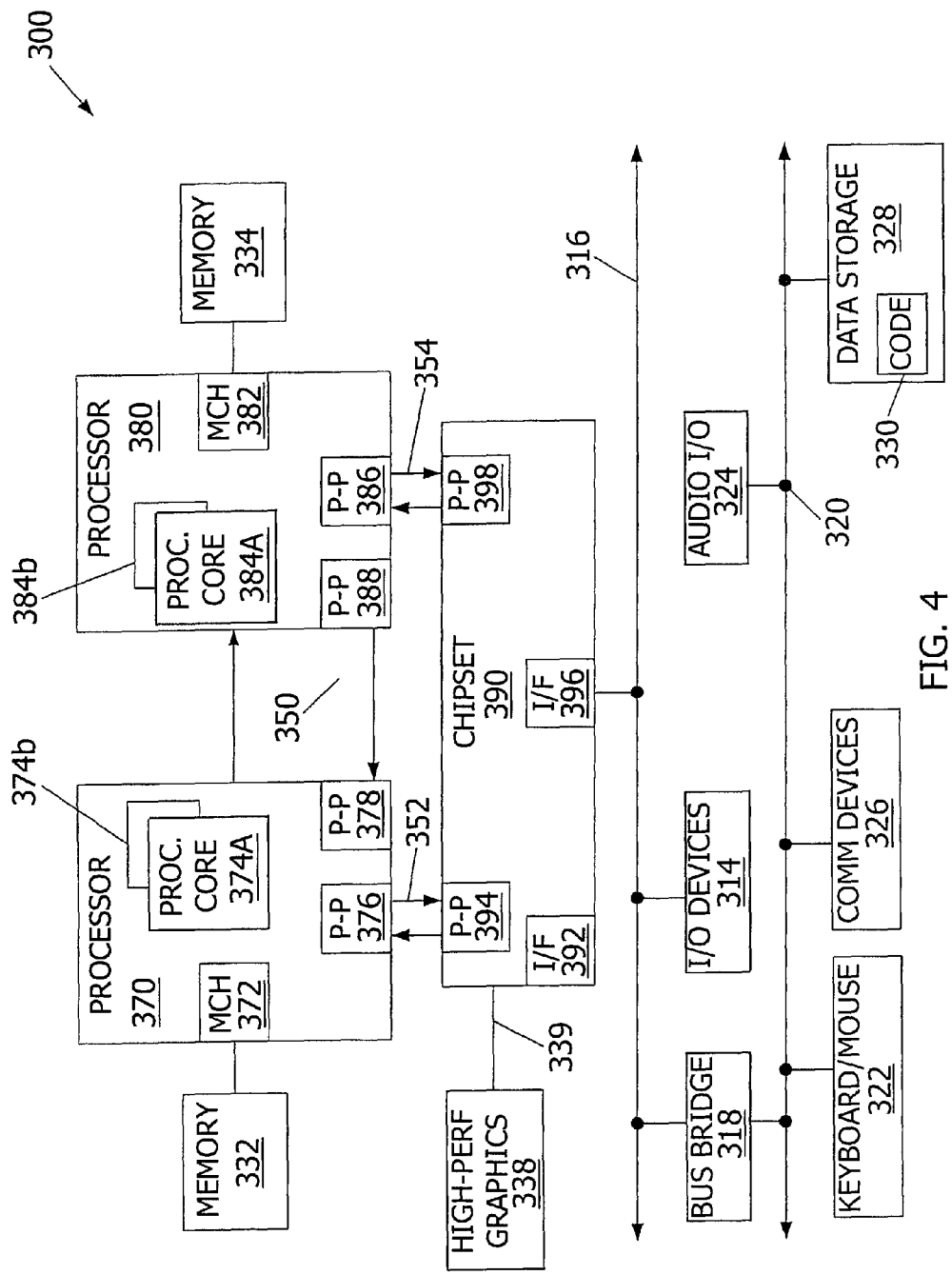
FIG. 4 is a block diagram of a system in accordance with an embodiment of the present invention.

Embodiments may be implemented in many different system types. Referring now to FIG. 4, shown is a block diagram of a system in accordance with an embodiment of the present invention. As shown in FIG. 4, multiprocessor system 300 is a point-to-point interconnect system, and includes a first processor 370 and a second processor 380 coupled via a point-to-point interconnect 350. As shown in FIG. 4, each of processors 370 and 380 may be multicore processors, including first and second processor cores (i.e., processor cores 374$a$ and 374$b$ and processor cores 384$a$ and 384$b$).

Still referring to FIG. 4, first processor 370 further includes a memory controller hub (MCH) 372 and point-to-point (P-P)

interfaces 376 and 378. Similarly, second processor 380 includes a MCH 382 and P-P interfaces 386 and 388. As shown in FIG. 4, MCH's 372 and 382 couple the processors to respective memories, namely a memory 332 and a memory 334, which may be portions of main memory (e.g., a dynamic random access memory (DRAM)) locally attached to the respective processors. First processor 370 and second processor 380 may be coupled to a chipset 390 via P-P interconnects 352 and 354, respectively. As shown in FIG. 4, chipset 390 includes P-P interfaces 394 and 398.

Furthermore, chipset 390 includes an interface 392 to couple chipset 390 with a high performance graphics engine 338. In turn, chipset 390 may be coupled to a first bus 316 via an interface 396. As shown in FIG. 4, various I/O devices 314 may be coupled to first bus 316, along with a bus bridge 318 which couples first bus 316 to a second bus 320. Various devices may be coupled to second bus 320 including, for example, a keyboard/mouse 322, communication devices 326 and a data storage unit 328 such as a disk drive or other mass storage device which may include code 330, in one embodiment. Such code may include a compiler in accordance with an embodiment of the present invention, which may execute on a one or more of processors 370 and 380. Further, an audio I/O 324 may be coupled to second bus 320.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

The invention claimed is:

1. A method comprising:
    identifying, using a compiler executing on a processor of a computer system, a byte swap operation;
    building, using the compiler, a domain including the byte swap operation and other expressions, wherein the other expressions are connected swap tolerant expressions that extend the domain, and identifying domain entries and domain exits associated with the domain;
    determining, using the compiler, that a benefit will be obtained by performing a swap of the domain based on profiling information stored in a performance monitor table during a first compilation pass, including calculating the benefit by determining that an amount of code removed from the domain minus an amount of code inserted to the domain is greater than a threshold, and responsive to the determination performing the swap of the domain during a second compilation pass, wherein performing the swap of the domain includes changing a byte order of at least some of the associated domain entries and domain exits, and substituting expressions in the domain with counterpart operations that operate in a different byte order, and removing a byte swap operation from a first expression and inserting a byte swap operation into a second expression, wherein the first expression is of a hotter path than a path of the second expression; and
    storing the swapped domain in a storage medium of the computer system.

2. The method of claim 1, wherein changing the byte order of a domain entry to the domain comprises removing a byte swap operation if the domain entry includes the byte swap operation, and otherwise inserting a byte swap operation if the domain entry does not include the byte swap operation.

3. The method of claim 1, wherein changing the byte order of a domain exit from the domain comprises removing a byte swap operation if the domain exit includes the byte swap operation, and otherwise inserting a byte swap operation if the domain exit does not include the byte swap operation.

4. The method of claim 1, wherein calculating the benefit includes weighting the inserted code and the removed code, and analyzing execution counters associated with the inserted code and the removed code.

5. The method of claim 1, wherein performing the swap of the domain comprises optimizing multiple connected expressions of the domain in a single pass.

6. An article comprising a machine-accessible storage medium including instructions that when executed enable a computer system to:
    obtain statistical information regarding execution of code on a processor of the computer system, wherein the statistical information is stored in a statistical storage of the computer system;
    parse, in a compiler that executes on the processor, data on which the code operates into a plurality of groups, wherein the data in each of the groups has a same byte order for proper execution of the code;
    determine, in the compiler, whether a byte order of the data of a group is visible to a programmer, for each of the plurality of groups;
    for each group in which the byte order is not visible, determine, in the compiler, if changing the byte order would provide a performance benefit based at least in part on the statistical information:
    update a destination list of a first pointer when the first pointer is sourced to a second pointer, and update a source list of the first pointer when another pointer is sourced to the first pointer:
    build a list of pointers achievable transitively through the source list and the destination list, and determine that the byte order change would provide the performance benefit if the union of the list of the pointers achievable transitively through the source list and the destination list contains no more than one non-zero element and a sum of a benefit computation for all pointers transitively accessible is positive;
    for each group in which the byte order change would provide the performance benefit, change a byte order of the corresponding group to obtain a modified group; and
    store each of the modified groups in a storage medium of the computer system.

7. The article of claim 6, further comprising instructions that when executed enable the computer system to update an access list for a third pointer with a size of an access when a memory access associated with the third pointer is encountered.

8. The article of claim 7, further comprising instructions that when executed enable the computer system to update a benefit counter of an expression of the code based on a performance benefit change due to a byte order change to the expression.

9. A system comprising:

a processor to execute instructions, the processor to execute a compiler to obtain statistical information regarding execution of code on the processor, parse data on which the code operates into a plurality of groups, wherein the data in each of the groups has a same byte order for proper execution of the code, for each group in which the byte order is not visible to a programmer determine if changing the byte order would provide a performance benefit and if so change a byte order of the corresponding group to obtain a modified group, and store each of the modified groups in a first storage medium of the system wherein the compiler is to identify a byte swap operation, build a domain including the byte swap operation and other expressions, wherein the other expressions are connected swap tolerant expressions that extend the domain, identify domain entries and domain exits associated with the domain, and determine that a benefit will be obtained by performing a swap of the domain based on profiling information stored in a performance monitor table during a first compilation pass, including calculating the benefit by determining that an amount of code removed from the domain minus an amount of code inserted to the domain is greater than a threshold, and wherein the compiler is to, responsive to the determination, perform the swap of the domain during a second compilation pass, wherein the swap of the domain includes changing a byte order of at least some of the associated domain entries and domain exits, and substituting expressions in the domain with counterpart operations that operate in a different byte order, and removing a byte swap operation from a first expression and inserting a byte swap operation into a second expression, wherein the first expression is of a hotter path than a path of the second expression, and store the swapped domain in the first storage medium; and a storage to store a source list, a destination list, and an access list for each pointer of the code.

10. The system of claim 9, wherein the compiler is to update the destination list of a first pointer when the first pointer is sourced to a second pointer, update the source list of the first pointer when another pointer is sourced to the first pointer, and update the access list for a third pointer with a size of an access when a memory access associated with the third pointer is encountered.

11. The system of claim 10, wherein the storage further comprises a benefit counter updateable based on a performance benefit change due to a byte order change to an expression.

* * * * *